United States Patent
Hopf et al.

(10) Patent No.: US 9,555,693 B2
(45) Date of Patent: Jan. 31, 2017

(54) AIR INTAKE DEVICE OF A VEHICLE-INTERIOR VENTILATION SYSTEM, AND VEHICLE-INTERIOR VENTILATION SYSTEM

(75) Inventors: Wolfgang Hopf, Stockheim (DE); Albert Gwosdek, Haslach (DE); Roland Haussmann, Wiesloch (DE)

(73) Assignee: VALEO KLIMASYSTEME GmbH, Bad Rodach (DE)

( * ) Notice: Subject to any disclaimer, the term of this patent is extended or adjusted under 35 U.S.C. 154(b) by 616 days.

(21) Appl. No.: 13/402,360

(22) Filed: Feb. 22, 2012

(65) Prior Publication Data

US 2013/0023193 A1   Jan. 24, 2013

(30) Foreign Application Priority Data

Feb. 22, 2011   (DE) .......................... 10 2011 011 975

(51) Int. Cl.
*B60H 3/06* (2006.01)
*B60H 1/00* (2006.01)

(52) U.S. Cl.
CPC ... *B60H 3/0616* (2013.01); *B60H 2001/00085* (2013.01); *B60H 2003/065* (2013.01)

(58) Field of Classification Search
CPC ............ B60H 2003/065; B60H 3/0616; B60H 2001/00085; B01D 2279/60; B01D 46/0004; B01D 46/10
USPC ....... 454/156, 158, 143, 146, 162, 163, 164; 55/323, 326, 327
See application file for complete search history.

(56) References Cited

U.S. PATENT DOCUMENTS

| | | | |
|---|---|---|---|
| 2,197,648 A * | 4/1940 | Mersheimer ............... | 180/69.21 |
| 5,501,716 A * | 3/1996 | Chiba et al. .................... | 96/400 |
| 6,722,152 B1 * | 4/2004 | Hille et al. ...................... | 62/262 |
| 6,991,532 B2 * | 1/2006 | Goldsmith .................... | 454/156 |
| 2004/0185767 A1 * | 9/2004 | Schneider ..................... | 454/158 |
| 2007/0238406 A1 * | 10/2007 | Jeong et al. .................. | 454/139 |

FOREIGN PATENT DOCUMENTS

DE   102009021047 A1 * 11/2010 ............... B60H 3/06

OTHER PUBLICATIONS

English Machine Translation of DE102009021047A1.*

* cited by examiner

*Primary Examiner* — Gregory Huson
*Assistant Examiner* — Dana Tighe
(74) *Attorney, Agent, or Firm* — Howard & Howard Attorneys PLLC

(57) ABSTRACT

The invention relates to an air intake device (16) of a vehicle-interior ventilation system (10), in particular of a vehicle air conditioner, having a filter chamber (18) which is arranged upstream of a fan blower (34), and a filter (32) which is arranged in the filter chamber (18), the filter chamber (18) having a fresh air inlet (22) upstream of the filter (32) and a filter maintenance opening (40) which makes it possible to install and dismantle the filter (32). Furthermore, the air intake device (16) comprises an air-guiding component (24) which can be dismantled and has a fresh air intake opening (28), which air-guiding component (24) forms a fresh air duct (26) which extends from the fresh air intake opening (28) to the fresh air inlet (22) of the filter chamber (18), and which air-guiding component (24) closes the filter maintenance opening (40) by way of a cover section (42).

15 Claims, 6 Drawing Sheets

Figure 1:
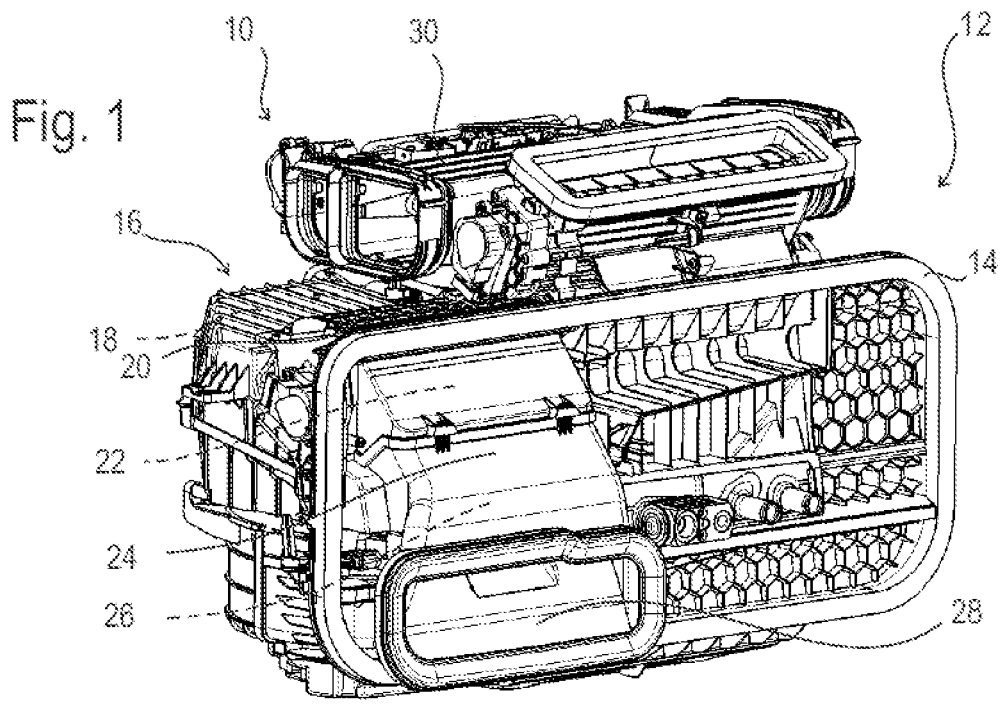

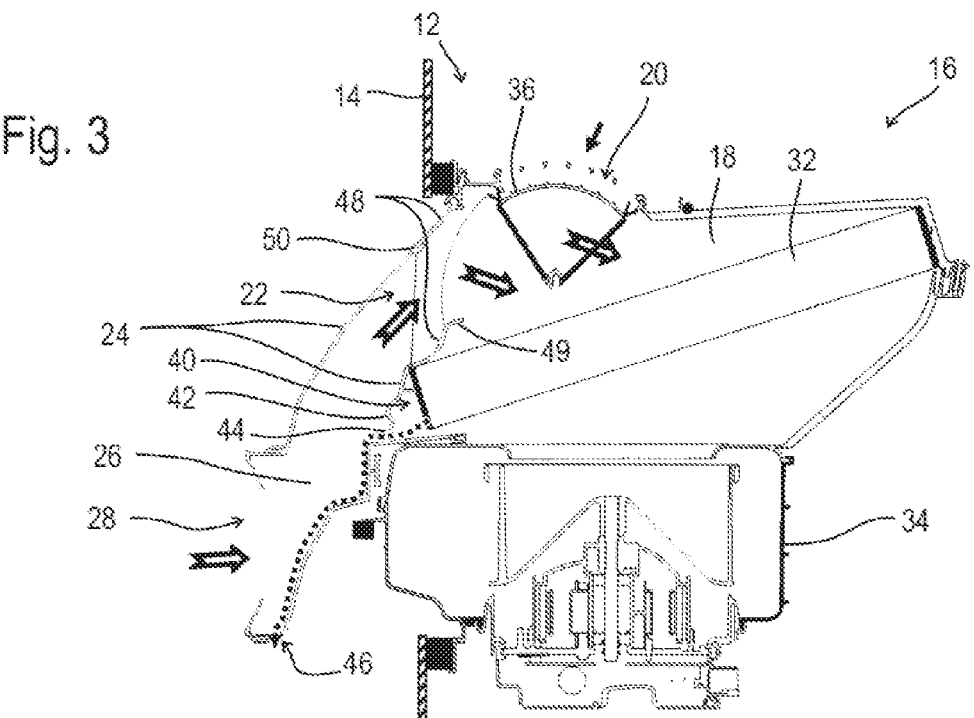
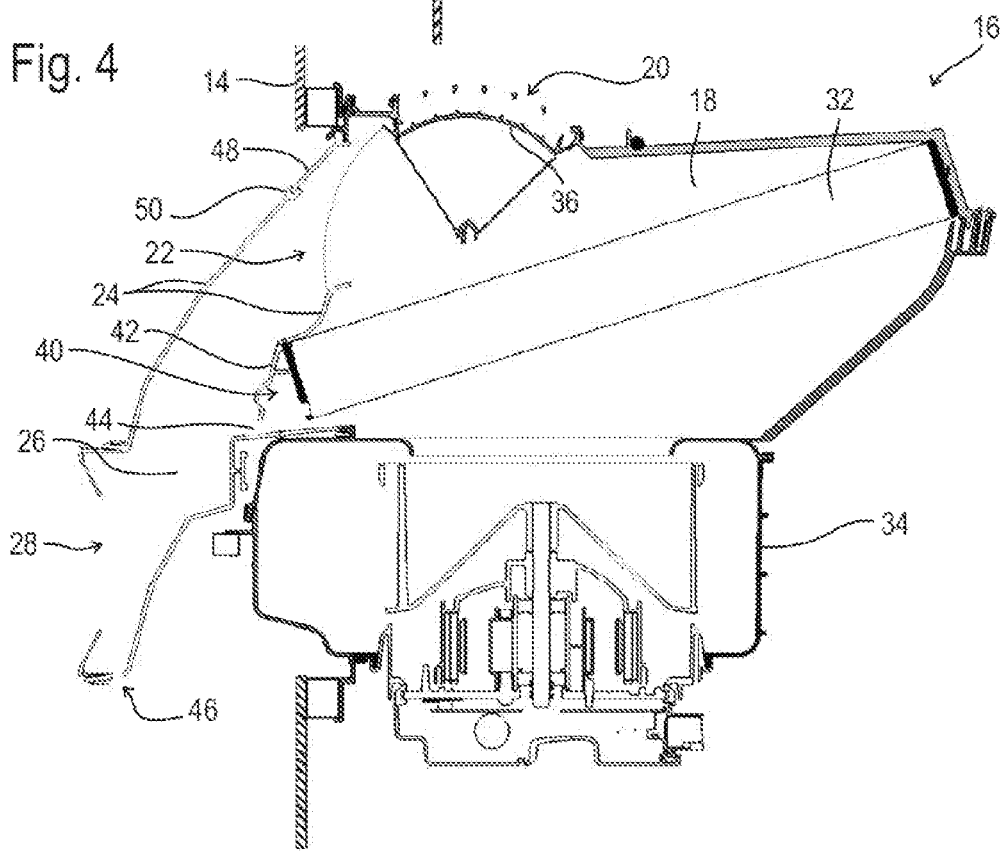

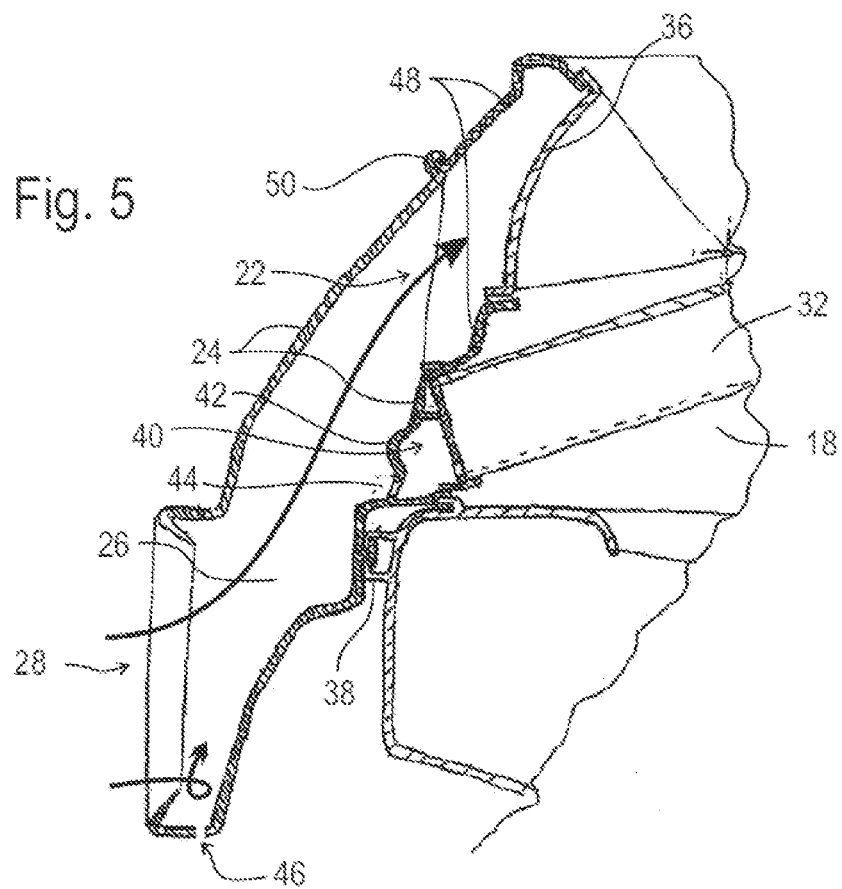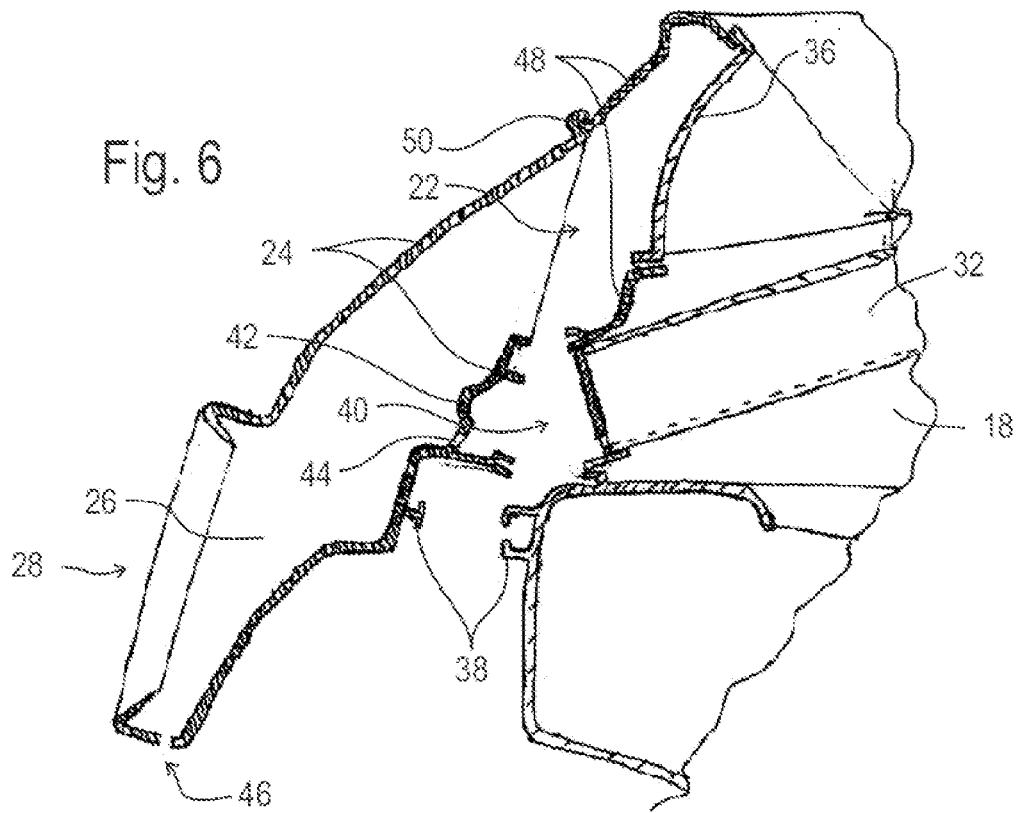

AIR INTAKE DEVICE OF A VEHICLE-INTERIOR VENTILATION SYSTEM, AND VEHICLE-INTERIOR VENTILATION SYSTEM

RELATED APPLICATIONS

This application claims priority to and all the advantages of German Patent Application No. 10 2011 011975.2, filed on Feb. 22, 2011.

The invention relates to an air intake device of a vehicle-interior ventilation system, in particular of a vehicle air conditioner, and to a vehicle-interior ventilation system itself.

Air intake devices of this type are known from the prior art, the filter maintenance opening being closed by a separate cover which has to be removed for installing and dismantling the filter.

Vehicle-interior ventilation systems are usually arranged in an interior of the vehicle, the available installation space being limited and it therefore possibly being difficult to reach the filter maintenance opening. Here, the fresh air inlet has to be sealed in a complex manner with respect to the surroundings of the interior, in order to avoid an inflow of warm air from the engine compartment.

It is an object of the invention to provide an air intake device of a vehicle-interior ventilation system, which air intake device makes a simple exchange of a filter possible and ensures a satisfactory supply of fresh air.

According to the invention, this object is achieved by an air intake device of a vehicle-interior ventilation system, in particular of a vehicle air conditioner, having a filter chamber which is arranged upstream of a fan blower, and a filter which is arranged in the filter chamber, the filter chamber having a fresh air inlet upstream of the filter and a filter maintenance opening which makes it possible to install and dismantle the filter. The air intake device comprises an air-guiding component which can be dismantled and has a fresh air intake opening, which air-guiding component forms a fresh air duct which extends from the fresh air intake opening to the fresh air inlet of the filter chamber, and which air-guiding component closes the filter maintenance opening by way of a cover section.

Fresh air can be sucked in via the fresh air duct independently of the position of the filter chamber in the vehicle. It can be avoided in this way that, for example, heated air in the engine compartment is sucked in. Since the air-guiding component forms the cover for the filter maintenance opening, a simple exchange of the filter is possible, since no separate, additional cover of the filter maintenance opening has to be mounted and dismantled.

A simple embodiment with a large filter maintenance opening is made possible by the filter maintenance opening extending from the fresh air inlet as far as the fan blower.

The required individual components can be reduced by the air-guiding component forming a mounting for the filter.

For example, the air-guiding component is mounted pivotably, in particular on the filter-chamber wall. This makes simple access to the filter maintenance opening possible by pivoting of the air-guiding component.

The air-guiding component can be connected in a positively locking manner to the filter-chamber wall, preferably by a quick-action locking means. In this way, a reliable connection of the air-guiding component and the filter-chamber wall is ensured, whereas at the same time simple locking and unlocking of the air-guiding component is made possible, preferably without tools.

In order to make an outflow of a liquid in the direction of the fresh air intake opening possible, in the installed state, the fresh air duct can run in the direction from the fresh air intake opening to the filter maintenance opening and preferably constantly upwards to the fresh air inlet.

The air-guiding component can have at least one outflow opening for liquid, which outflow opening connects the filter chamber to the fresh air duct, preferably in such a way that liquid which condenses on the filter can run out through the outflow opening into the fresh air duct.

In order to dewater the fresh air duct, in the installed state, the air-guiding component can have a dewatering opening at the lowermost point of the fresh air duct, which dewatering opening is preferably arranged in a dead water region of the fresh air duct.

The fresh air duct can have a groove-shaped dewatering channel which extends from the outflow opening to the dewatering opening, the dewatering channel preferably having a cover.

It is possible that, in the installed state, the filter is installed such that it is inclined with respect to the horizontal, and the lower end of the filter is arranged at the filter maintenance opening. In this way, the outflow of liquid which condenses on the filter to the filter maintenance opening is ensured.

For example, the filter has a filter frame which has at least one frame opening which makes an outflow of a liquid which condenses in the filter possible, a frame opening being provided for each filter fold, for example.

A recycling duct preferably opens into the filter chamber, which recycling duct can be closed by means of a flap, the flap lying remote from the filter maintenance opening such that, during the dismantling, the filter can be moved such that it is remote from the openings which are assigned to the flap. In this way, the installation and dismantling of the filter is not influenced by the flap.

It is possible that the air-guiding component is configured in such a way that, in the installed state of the ventilation system, the fresh air duct extends through a protective wall of the vehicle, which protective wall separates an interior of the vehicle from the engine compartment, the filter chamber being arranged in the vehicle interior and the fresh air intake opening being arranged outside the vehicle interior.

The air-guiding component preferably extends to a dedicated fresh air intake on the engine bonnet side. It is therefore ruled out that hot engine air is sucked in.

Furthermore, the invention relates to a vehicle-interior ventilation system, in particular a vehicle air conditioner, having an above-described air intake device.

Figure 2:
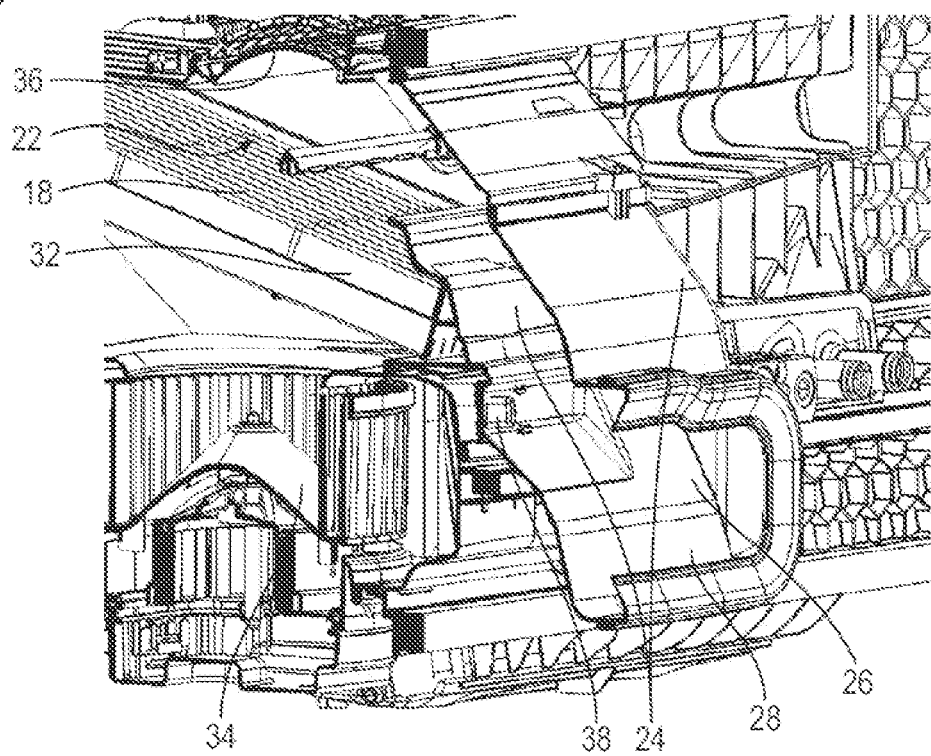
Figure 7:
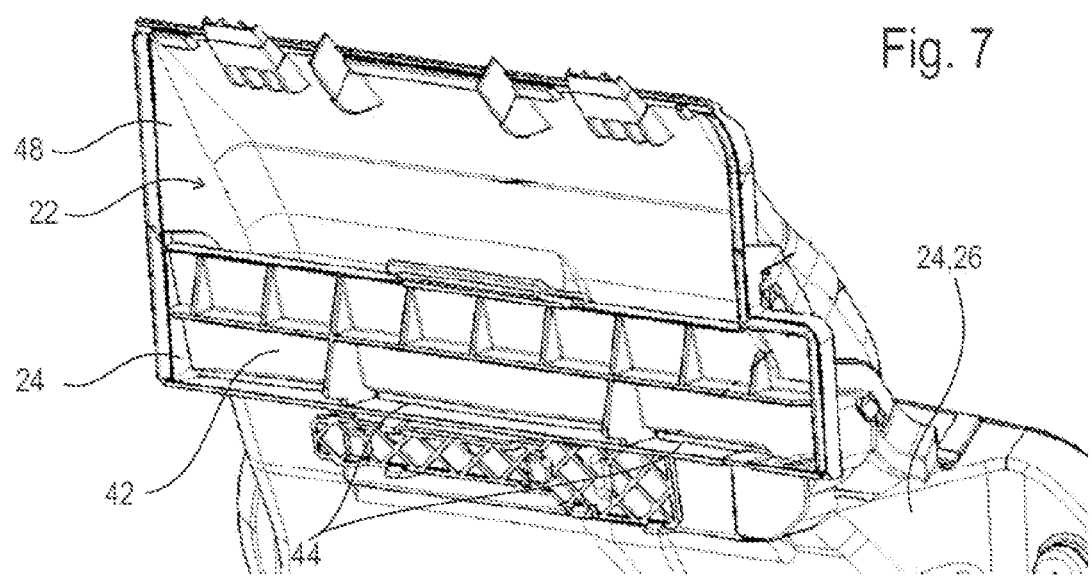
Figure 8:
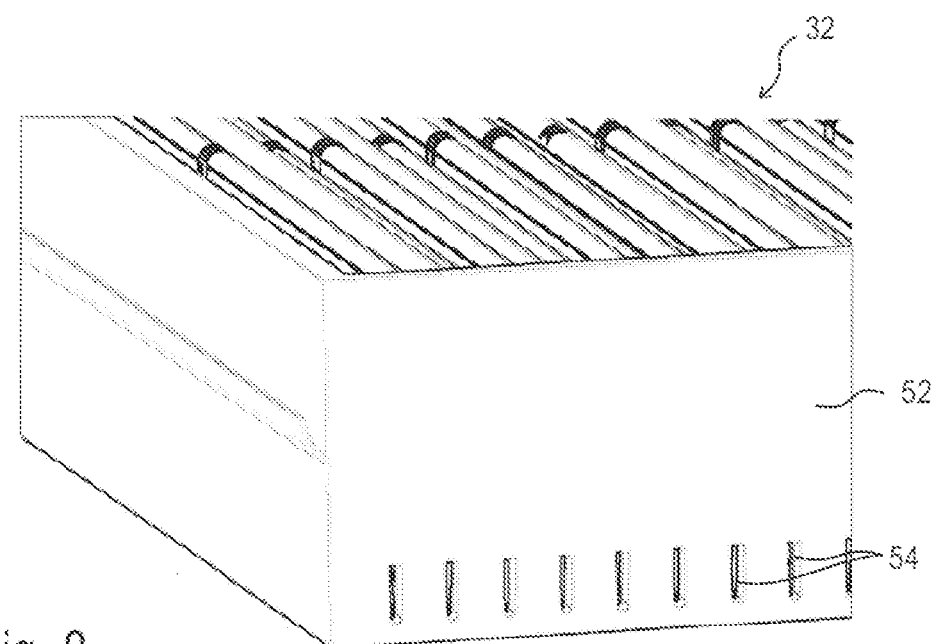
Figure 9:
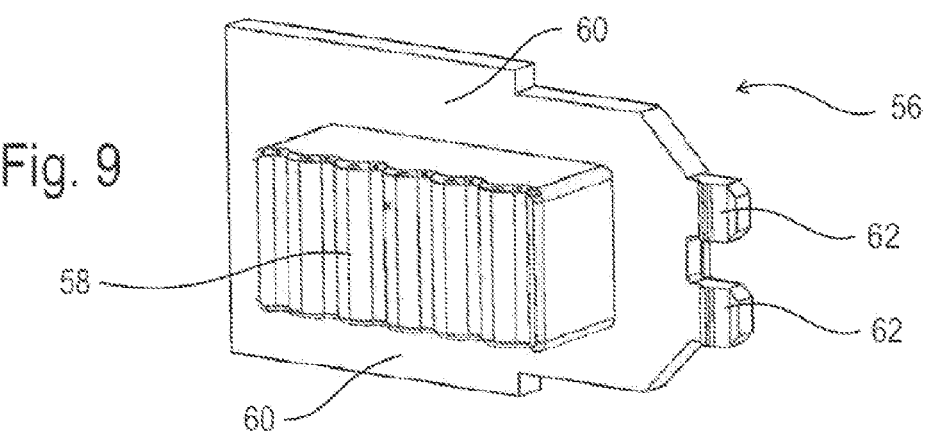
Figure 10:
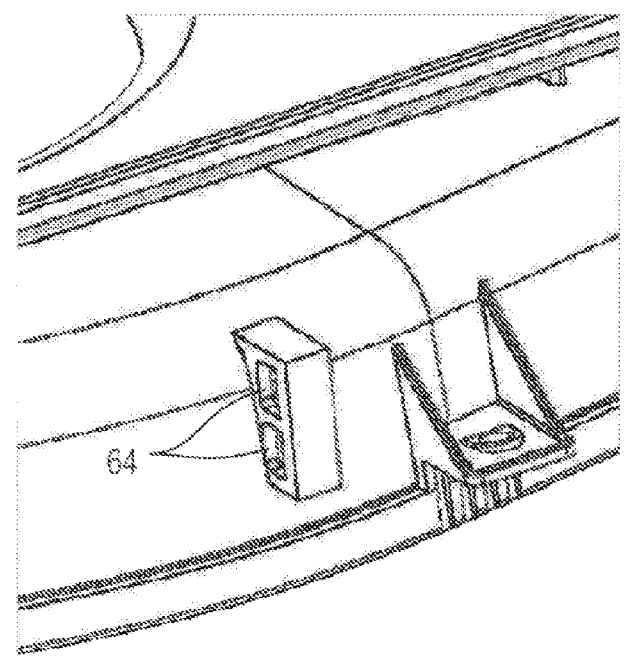
Figure 11:
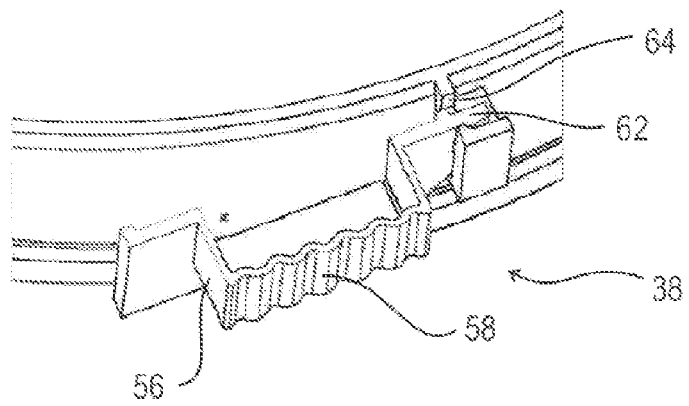
Figure 12:
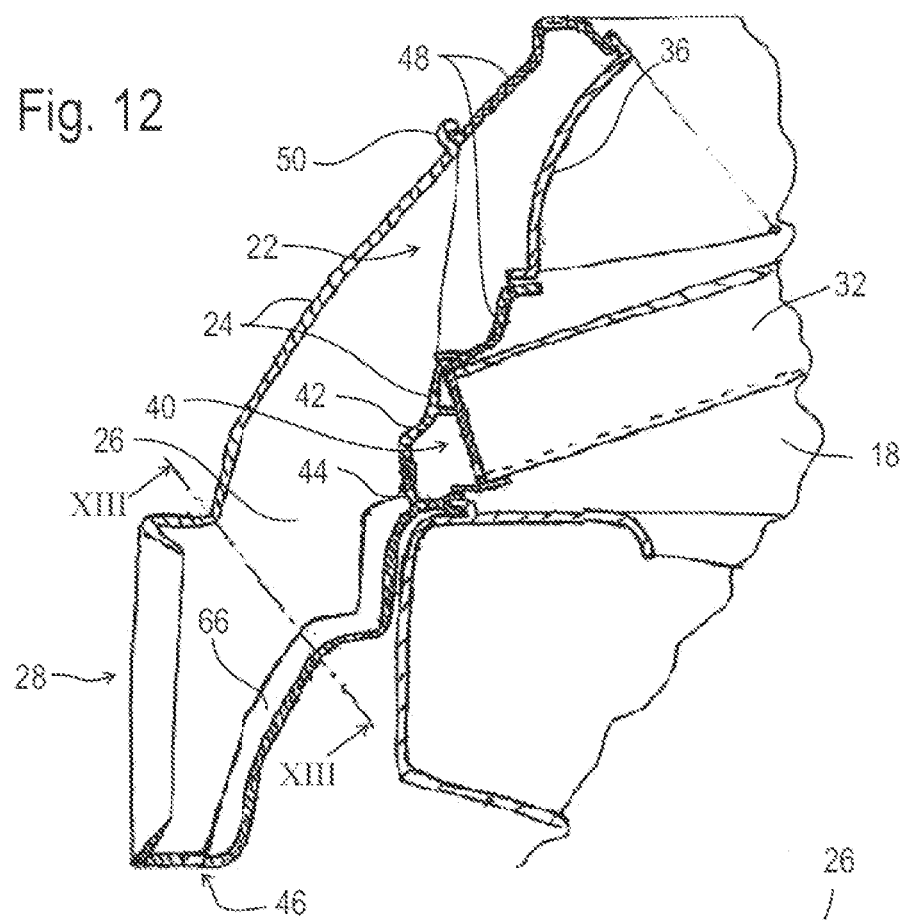
Figure 13:
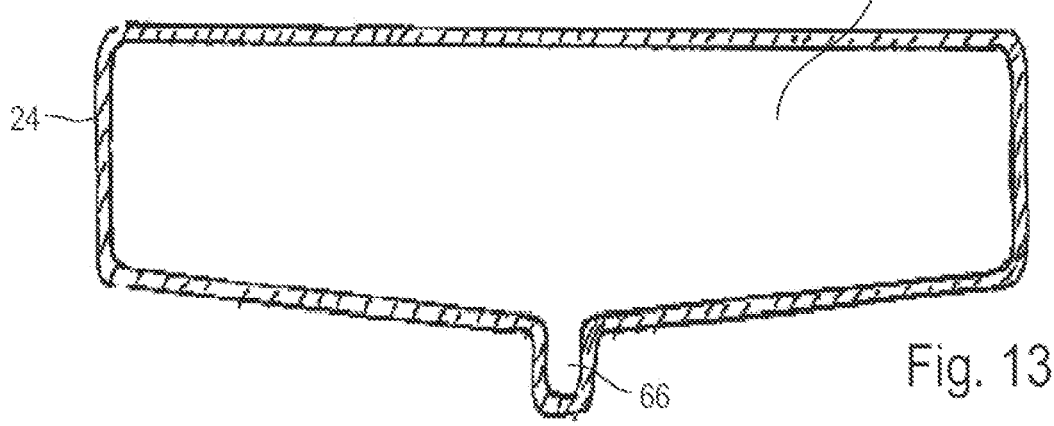
Figure 14:
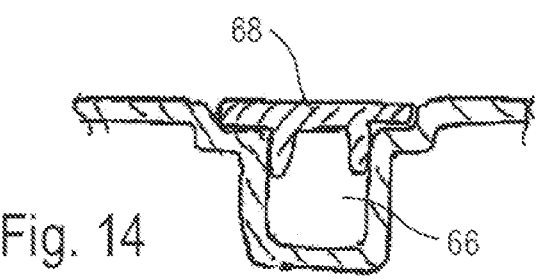

Further features and advantages of the invention result from the following description and from the drawings, to which reference is made and in which:

FIG. 1 shows a vehicle-interior ventilation system according to the invention, FIG. 2 shows a detailed view of an air intake device according to the invention of the vehicle-interior ventilation system according to FIG. 1, FIG. 3 shows a sectional view of an air intake device according to a first embodiment of the invention, FIG. 4 shows a sectional view of an air intake device according to a second embodiment of the invention, FIG. 5 shows a detailed view of an air-guiding component of the air intake device according to FIG. 3, FIG. 6 shows the air-guiding component according to FIG. 5 in a dismantled state, FIG. 7 shows a perspective detailed view of the air-guiding component according to FIG. 5, FIG. 8 shows a detailed view of a filter of an air intake device according to the invention, FIG. 9 shows a locking element of an air intake device according to the invention, FIG. 10 shows a housing-side component of a locking assembly of an air intake device according to the invention, FIG. 11 shows a sectional view of a locking assembly of an air intake device according to the invention, FIG. 12 shows a sectional view of an air intake device according to a third embodiment of the invention, FIG. 13 shows a sectional view through the air-guiding component along the sectional plane XIII-XIII of the air intake device according to FIG. 12, and FIG. 14 shows a further embodiment variant of the air-guiding component of the air intake device according to FIG. 12.

FIG. 1 shows a vehicle-interior ventilation system 10 which is arranged in an interior 12 of a vehicle. The interior 12 is separated by a diagrammatically shown protective wall 14 from the engine compartment or another space which is connected to the surroundings of the vehicle. The interior 12 of the vehicle is provided behind the protective wall 14 in the perspective illustration of FIG. 1.

The vehicle-interior ventilation system 10 comprises an air intake device 16 which is suitable for sucking fresh air out of the surroundings or a vehicle space which is connected to the surroundings of the vehicle, or recycled air from the vehicle interior. The device 16 is arranged on the left-hand side in the vehicle-interior ventilation system 10 shown.

Furthermore, the vehicle-interior ventilation system 10 comprises an air conditioning device 30 which is configured for cooling, heating and/or for distributing the air which is sucked in to different ventilation outlets which are assigned, for example, to a windscreen or various air outlet nozzles in the vehicle interior.

FIG. 2 shows a detailed view of a section through the air intake device 16 of the vehicle-interior ventilation system 10. A filter chamber 18 is provided in the air intake device 16, having a recycling inlet 20 (see FIG. 1) and a fresh air inlet 22 which is connected to an air-guiding component 24. The air-guiding component 24 forms a fresh air duct 26 which extends through the protective wall 14 out of the interior 12 of the vehicle and connects the fresh air inlet 22 of the filter chamber 18 to a fresh air intake opening 28.

A filter 32 is provided in the filter chamber 18, which filter 32 is arranged between a fan blower 34 and the recycling inlet 20 or the fresh air inlet 22 and filters the recycled air or fresh air which is sucked in.

A flap 36 is provided which can optionally close the fresh air inlet 22 or the recycling inlet 20 of the filter chamber 18. In the illustration of FIG. 2, the recycling inlet 20 of the filter chamber 18 is closed by the flap 36.

The air-guiding component 24 is attached in a manner which can be dismantled to the housing of the air intake device 16. A locking assembly 38 makes positive locking of the air-guiding component 24 to the housing of the air intake device 16 possible.

FIG. 3 shows a sectional view of the air intake device 16 which, in the selected illustration, is positioned substantially on the right-hand side of the protective wall 14 in the interior 12 of the vehicle, the air intake device 16 being arranged at an opening of the protective wall in a manner which is sealed by a sealing device.

The recycling inlet 20 and the fresh air inlet 22 of the filter chamber 18 are arranged adjacently to one another and in this way can optionally be closed by a flap 36 of compact configuration. FIG. 3 shows the flap 36 in a position, in which it closes the recycling inlet 20 completely and opens the fresh air inlet 22 completely.

On account of the compact configuration of the flap 36, the filter 32 can be arranged at a position below the flap mechanism, as a result of which the filter 32 can be introduced and removed independently of the position of the flap 36.

The fan blower 34 is arranged below the filter chamber 18, which fan blower 34 provides an air flow to the air conditioning device 30 of the vehicle-interior ventilation system 10.

The filter chamber 18 has a filter maintenance opening 40 which makes it possible to install and dismantle the filter 32. For this purpose, the filter 32 can be introduced through the filter maintenance opening 40 into the filter chamber 18 and removed.

The filter maintenance opening 40 is closed by a cover section 42 of the air-guiding component 24. The cover section 42 of the air-guiding component 24 forms an axial mounting for the filter 32, by the section 42 producing an axial stop for the filter 32. In this way, no separate component is required as a cover for the filter maintenance opening 40.

The filter 32 is installed such that it is inclined with respect to the horizontal. On account of the inclination of the filter 32, a liquid which condenses on the filter flows in the direction of the filter maintenance opening 40. At least one outflow opening 44 is provided in the cover section 42 of the air-guiding component 24, which outflow opening 44 connects the filter chamber 18 to the fresh air duct 26, with the result that the liquid can run out through the outflow opening 44 into the fresh air duct 26.

The liquid runs in the fresh air duct 26 to a lowest point, at which the fresh air duct 26 has a dewatering opening 46, through which the liquid can exit the air intake device 16 in a defined manner.

In the embodiment which is shown in FIG. 3, the fresh air inlet 22 is formed completely by a fixedly mounted filter-chamber wall 48, 49. In this embodiment, the filter maintenance opening 40 extends from the lower filter-chamber wall 49 of the fresh air inlet 22 on the side of the filter 32 as far as the housing of the fan blower 34.

FIG. 4 shows an alternative embodiment, in which the lower section 49 (shown in FIG. 3) of the fresh air inlet 22, which section 49 lies on the side of the filter 32, is formed by the air-guiding component 24 which can be dismantled. When the air-guiding component 24 is dismantled, the fresh air inlet 22 therefore forms a common opening with the filter maintenance opening 40. The installation and dismantling of the filter 32 is facilitated by this large common opening. The further features are identical with the embodiment which is shown in FIG. 3.

FIG. 5 shows a detailed view of the air-guiding component 24 of the air intake device 16 according to FIG. 3 in the mounted position. The air-guiding component 24 is mounted on the filter-chamber wall 48 such that it can be pivoted via a pivoting bearing 50. The air-guiding component 24 is fixed in the mounted position by a locking assembly 38.

The locking assembly 38 is configured as a quick-action locking means and is arranged in such a way that it can be reached in a simple way from the fresh air intake opening 28 of the fresh air duct 26 and can preferably be opened and closed manually without additional tools.

When the locking assembly 38 is open, the air-guiding component 24 can be pivoted out of its mounting position, as shown in FIG. 6. In the pivoted-out position, the connection of the air-guiding component 24 and the filter-chamber wall 48 on the pivoting bearing 50 can be released and the air-guiding component 24 can be removed completely. In this way, the filter maintenance opening 40 is opened completely and a simple exchange of the filter 32 is made possible.

As can be seen readily in FIG. 6, projections are provided on the air-guiding component 24 or on the filter-chamber wall 48 or corresponding other housing parts of the air intake device 16, which projections engage into one another in the mounted position of the air-guiding component 24 and form a seal of the filter chamber 18. The seal can be configured as a labyrinth seal or can be formed by separate or integrally formed sealing elements.

FIG. 7 shows a perspective rear view of the air-guiding component 24 and the adjoining filter-chamber wall 48 from the side of the filter chamber 18. In the embodiment which is shown, the cover section 42 has two outflow openings 44.

The air-guiding component 24 is configured in such a way that, in the installed state in the vehicle, it extends to a dedicated fresh air intake on the engine bonnet side. In this way, fresh air is sucked in via the fresh air intake and the air-guiding component 24, and the intake of air which has already been heated from the interior or the engine compartment can be avoided.

The arrangement which is shown in the figures is advantageous, in particular, in trucks, in which the driver's cab is arranged above the engine compartment.

FIG. 8 shows a detailed view of the filter 32. The filter 32 has a filter frame 52, in which the filter material is received. The filter 32 is produced from a hydrophobic material and forms a plurality of filter folds. A frame opening 54 is provided in the filter frame 52 at each filter fold, through which frame opening 54 the liquid which condenses in the filter can run out. As an alternative, it is possible that a frame opening is assigned to a plurality of filter folds.

The liquid in the filter material can accumulate on account of droplets and aerosols transported in the air flow or as a result of condensation on the filter material.

In the following text, the locking assembly 38 will be described using FIGS. 9 to 11. The locking assembly 38 forms a quick-action locking means which can be actuated manually without an additional tool. FIG. 9 shows a locking element 56, having a profiled actuating region 58, a guide projection 60 and two locking projections 62. The guide projections 60 make it possible to mount the locking element 56 on the air-guiding component 24 and to displace the locking element 56 linearly in the direction of the locking projections 62 relative to the air-guiding component 24 and the corresponding housing part of the air intake device 16.

FIG. 10 shows the housing component of the air intake device 16 with a projection, in which two locking recesses 64 are provided.

FIG. 11 shows a sectional view through the locking assembly 38 in its locked position, the locking element 56 engaging with the locking projections 62 into the locking recesses 64 of the housing projection. In this way, a positively locking connection is produced which prevents pivoting of the air-guiding component 24 about the pivoting bearing 50.

A further embodiment of the air intake device 16 is shown in FIGS. 12 and 13. In the embodiment which is shown, a central outflow opening 44 is provided in the cover section 42 of the air-guiding component 24, which outlet opening 44 opens into a groove-shaped dewatering channel 66. The dewatering channel 66 extends from the outflow opening 44 to the dewatering opening 46. FIG. 13 shows the cross section of the fresh air duct 26 with the groove-shaped dewatering channel 66. It is also possible that a plurality of outflow openings 44 are provided with a corresponding plurality of dewatering channels 66, or that a plurality of outflow openings 44 open into a common dewatering channel 66.

In an alternative embodiment according to FIG. 14, the dewatering channel 66 has a cover 68. In this way, the flow of the liquid in the dewatering channel 66 is substantially independent of the air flow conditions in the fresh air duct 26. The cover 68 is configured in such a way that it bears flushly against the wall of the fresh air duct 26.

The invention claimed is:

1. An air intake device (16) of a vehicle-interior ventilation system (10), said device comprising:
    a filter chamber (18) which is arranged upstream of a fan blower (34), and a filter (32) which is arranged in the filter chamber (18), the filter chamber (18) having a fresh air inlet (22) upstream of the filter (32) and a filter maintenance opening (40) which makes it possible to install and dismantle the filter (32), and
    one air-guiding component (24) which can be dismantled and has an exterior cover section and an interior cover section (42) defining a fresh air intake opening (28), which air-guiding component (24) forms a fresh air duct (26) which extends from the fresh air intake opening (28) to the fresh air inlet (22) of the filter chamber (18), which air-guiding component (24) closes the filter maintenance opening (40) by way of the interior cover section (42), wherein the air-guiding component (24) is connected in a positively locking manner to a filter-chamber wall (48) by a quick-action locking means comprising at least one projection on one of the interior cover section (42) and a housing of the air intake device (16) and at least one recess on another one of the interior cover section (42) and the housing of the air intake device (16) and accessible from the fresh air intake opening (28), and wherein the interior cover section (42) of the air-guiding component (24) forms a mounting for the filter (32).

2. The air intake device (16) according to claim 1, wherein the filter maintenance opening (40) extends from the fresh air inlet (22) as far as the fan blower (34).

3. The air intake device (16) according to claim 1, wherein the air-guiding component (24) is mounted pivotably on the filter-chamber wall (48).

4. The air intake device (16) according to claim 1, wherein, in the installed state, the fresh air duct (26) runs in the direction from the fresh air intake opening (28) to the filter maintenance opening (40) and constantly upwards to the fresh air inlet (22).

5. The air intake device (16) according to claim 1, wherein the air-guiding component (24) has at least one outflow opening (44) for liquid, which outflow opening (44) connects the filter chamber (18) to the fresh air duct (26) such that liquid which condenses on the filter (32) can run out through the outflow opening (44) into the fresh air duct (26).

6. The air intake device (16) according to claim 5, wherein the fresh air duct (26) has a groove-shaped dewatering channel (66) which extends from the outflow opening (44) to the dewatering opening (46).

7. The air intake device (16) according to claim 6, further comprising a cover (68) for covering the dewatering channel (66).

8. The air intake device (16) according to claim 1, characterized in that, in the installed state, the air-guiding component (24) has a dewatering opening (46) at the lowermost point of the fresh air duct (26).

9. The air intake device (16) according to claim 1, wherein, in the installed state, the filter (32) is installed such that it is inclined with respect to the horizontal, and a lower end of the filter (32) is arranged at the filter maintenance opening (40).

10. The air intake device (16) according to claim 1, wherein the filter (32) has a filter frame (52) which has at least one frame opening (54) which makes an outflow of a liquid which condenses in the filter (32) possible.

11. The air intake device (16) according to claim 10, wherein a frame opening (54) is provided for each filter fold.

12. The air intake device (16) according to claim 1, wherein a recycling duct opens into the filter chamber (18), which recycling duct can be closed by means of a flap (36), the flap (36) lying remote from the filter maintenance opening (40) such that, during the dismantling, the filter (32) can be moved such that it is remote from the openings (20, 22) which are assigned to the flap (36).

13. The air intake device (16) according to claim 1, wherein the air-guiding component (24) is configured in such a way that, in the installed state of the ventilation system (10), the fresh air duct (26) extends through a protective wall (14) of the vehicle, which protective wall (14) separates an interior (12) of the vehicle from an engine compartment, the filter chamber (18) being arranged in the vehicle interior (12) and the fresh air intake opening (28) being arranged outside the vehicle interior (12).

14. The air intake device (16) according to claim 1, wherein the air-guiding component (24) extends to a dedicated fresh air intake on an engine bonnet side.

15. A vehicle-interior ventilation system (10) having the air intake device (16) according to claim 1.

* * * * *